(12) United States Patent
Zhu et al.

(10) Patent No.: US 8,990,045 B2
(45) Date of Patent: Mar. 24, 2015

(54) PEDOMETER WITH SHOE MOUNTED SENSOR AND TRANSMITTER

(75) Inventors: Shengbo Zhu, San Jose, CA (US); Su Shiong Huang, Bellevue, WA (US)

(73) Assignee: Silicon Valley Micro E Corp., San Jose, CA (US)

( * ) Notice: Subject to any disclaimer, the term of this patent is extended or adjusted under 35 U.S.C. 154(b) by 838 days.

(21) Appl. No.: 12/592,094

(22) Filed: Nov. 18, 2009

(65) Prior Publication Data

US 2011/0119027 A1 May 19, 2011

(51) Int. Cl.
*G01C 22/00* (2006.01)

(52) U.S. Cl.
CPC .................................... *G01C 22/006* (2013.01)
USPC ............................ 702/160; 702/127; 702/158

(58) Field of Classification Search
CPC ....................... G01C 22/006; A61B 2562/0219
USPC ............ 702/127, 158, 160, 161; 73/760–777; 235/105
See application file for complete search history.

(56) References Cited

U.S. PATENT DOCUMENTS

| | | | | |
|---|---|---|---|---|
| 4,703,445 A * | 10/1987 | Dassler | ......................... | 702/160 |
| 4,956,628 A * | 9/1990 | Furlong | .................... | 340/323 R |
| 5,807,283 A * | 9/1998 | Ng | ................................ | 600/595 |
| 6,145,389 A | 11/2000 | Ebeling et al. | | |
| 6,175,608 B1 | 1/2001 | Pyles et al. | | |
| 6,219,625 B1 * | 4/2001 | Singh | ............................ | 702/160 |
| 6,243,659 B1 * | 6/2001 | Dominici et al. | ............. | 702/160 |
| 7,596,891 B2 | 10/2009 | Carnes et al. | | |
| 2007/0006489 A1 * | 1/2007 | Case et al. | ....................... | 36/132 |
| 2008/0082025 A1 * | 4/2008 | Hughes et al. | ................ | 600/595 |
| 2009/0107009 A1 * | 4/2009 | Bishop et al. | .................. | 36/114 |

FOREIGN PATENT DOCUMENTS

WO  WO 2008087651 A2 * 7/2008

* cited by examiner

*Primary Examiner* — John Breene
*Assistant Examiner* — Yaritza H Perez Bermudez

(57) ABSTRACT

A pedometer has first and second signal generators mounted along the inner margin of a first shoe and separated by a fixed distance. A sensor and transmitter assembly is mounted along the inner margin of a second shoe. The sensor and transmitter assembly includes a sensor, a microcontroller unit and a wireless transmitter. A pair of impulses is received by the microcontroller unit each time the shoes pass in close proximity to each other. The microcontroller unit generates various pedestrian performance data based on the impulses. The pedestrian performance data is wirelessly transmitted to a display unit carried by the pedestrian.

13 Claims, 6 Drawing Sheets

PEDOMETER WITH SHOE MOUNTED SENSOR AND TRANSMITTER

BACKGROUND OF THE INVENTION

This invention relates to pedometers used to measure pedestrian step counts and calculate distances traveled on foot. More particularly, this invention relates to a pedometer that comprises a shoe mounted system that acquires pedestrian performance data and transmits calculated results to a separate display unit.

Pedometers are being increasingly used by both professional and amateur fitness enthusiasts as an aid in monitoring and evaluating exercise routines. By using a pedometer, a person can measure and record a variety of data parameters, such. as: step count, distance traveled, speed, and calories burned to name a few. These parameters are useful in determining the effectiveness and efficiency of a particular fitness program. Additionally, a pedometer may be used as a motivational device by providing a person with a way to track their daily physical activity level and correspondingly establish increased activity level targets. The use of a pedometer, in many instances, has motivated people to significantly increase their physical activity levels resulting in lower blood pressure, weight loss and better overall fitness.

Several different types of pedometers are known and are currently available. These known pedometers utilize a range of technologies to determine step counts and distances. One classic type of known pedometer is a mechanical device that uses a pendulum to detect physical motion and then convert that motion into a step count. A person typically wears the mechanical pedometer on their belt in a substantially vertical orientation. As the person walks, their hips induce a swinging motion into the pedometer, which in turn causes a weighted pendulum to move within the pedometer housing. The inertia of the pendulum is sensed by means of a ratchet mechanism or mechanical stop, which thereby advances a mechanical counter. While somewhat useful, pedometers using a pendulum to detect steps frequently record "false steps" or erroneous movements such as bending over and leaning. Moreover, pendulum actuated pedometers are sensitive to proper vertical alignment and usually require mechanical adjustment in relation to the gait/stride of the user in order to accurately record steps and convert the number of steps to a distance value.

Other types of known pedometers use electro-mechanical systems to detect and record a step count. Once such pedometer counts steps by means of one or more electro-mechanical switches embedded within a shoe. As a person steps, the switch is either opened or closed creating an electrical signal which is used to increment an electronic counter. Although this type of pedometer is usually more accurate than pendulum-type pedometers, false steps are still frequently recorded such as when a person shifts their weight from one foot to another. In addition, it is more than a trivial task to incorporate the switches in a shoe so that the switches reliably sense each step. Further, the switches are prone to contamination in situ and are susceptible to wear given the harsh environment in which they are located.

More sophisticated electro-mechanical pedometers use one or more accelerometers and microprocessors properly programmed to detect pedestrian steps. These pedometers generally have 1-, 2- or 3-axis accelerometers to measure accelerations and generate electronic signals corresponding to physical movement. The software in the microprocessor then processes the electronic acceleration signals to determine step count, step frequency and stride length. While this type of pedometer is useful and possibly more accurate than pendulum based and switch based pedometers at high-frequency step counts, false steps and erroneous distances can be generated during low speed movement. Additionally, improper axial alignment of the accelerometers during use can adversely affect the accuracy of these pedometers.

In one known accelerometer-type pedometer described in U.S. Pat. No. 6,145,389 to Ebeling et al., Nov. 14, 2000 (the entire disclosure of which is hereby incorporated by reference) an accelerometer is attached to a shoe and a microprocessor uses the signals generated by the accelerometer to calculate stride length. This pedometer requires that the accelerometer be carefully aligned such that the axis of acceleration measurement is substantially aligned with the direction of pedestrian foot travel. Correspondingly, should improper axial alignment of the accelerometer occur during use, incomplete and inaccurate measurements can result.

In another known accelerometer-type pedometer described in U.S. Pat. No. 6,175,608 to Pyles et al., Jan. 16, 2001 (the entire disclosure of which is hereby incorporated by reference) an inertial device is mounted to the waist, chest, or leg of a user to determine stride count. The inertial device of this pedometer detects gross physical movements similar to pendulum-type pedometers. While this type of pedometer is useful, false steps or irrelevant movements, such as bending over and leaning, may be erroneously recorded as steps. Moreover, since the inertial device determines step count based on acceleration, low-speed steps may not be accurately detected. Additionally, improper alignment of the inertial device during use may adversely affect the accuracy of these pedometers.

Efforts to provide a pedometer devoid of the above-noted disadvantages have not met with success to date.

SUMMARY OF THE INVENTION

The invention comprises a pedometer which is devoid of the above-noted disadvantages, which substantially reduces false step count readings and provides high accuracy at low speeds, and which is relatively simple to implement in existing foot wear.

In a broadest aspect, the invention comprises a pedometer having a first signal generator carried by a first portion of a first shoe; a second signal generator carried by a second portion of the first shoe, the first and second signal generators being separated by a fixed distance; and a sensor assembly coupled with a second shoe, the sensor assembly including a sensor for sensing signals generated by the first and second signal generators and for generating corresponding electrical signals, and a microcontroller unit having an input coupled to the sensor for receiving the corresponding electrical signals and converting the corresponding electrical signals into pedestrian performance data. The first and second signal generators and the sensor are preferably aligned on the first and second shoes in facing relation when the first and second shoes are worn by a user so as to maximize the incidence of detection of the signals from the first and second signal generators by the sensor.

Preferably, the first and second signal generators are mounted adjacent the inner margin of the first shoe, and the sensor is mounted adjacent the inner margin of the second shoe. The fixed separation distance between the first and second signal generators preferably extends generally longitudinally of the first shoe.

The first and second signal generators and the sensor are alternately implemented using a variety of technologies. In a magnetic technology implementation, the first and second signal generators comprise permanent magnets; and the sensor comprises a device such as a Hall effect sensor or an MR sensor for converting the magnetic fields generated by the permanent magnets to corresponding electrical signals. In an optical technology implementation, the first and second signal generators comprise light radiation sources, such as light emitting diodes; and the sensor comprises a device for converting the light radiation generated by the light radiation sources to corresponding electrical signals. In an r.f. technology implementation, the first and second signal generators comprise RFID tags for generating r.f. signals of known frequency; and the sensor comprises an RFID reader device for converting r.f. signals received from the RFID tags to corresponding electrical signals. The RFID signal generator tags may comprise either active or passive RFID tags.

The pedometer may further include a transmitter coupled to the microcontroller unit for transmitting the pedestrian performance data to a receiver/display unit to provide real time user feedback.

Pedometers fabricated according to the teachings of the invention are simple to incorporate into foot wear at the point of manufacture or as an after market item at relatively low cost. Such pedometers are capable of providing accurate pedestrian performance data, such as foot speed, step count, distance traveled, cadence and many other performance parameters of potential interest to users.

For a fuller understanding of the nature and advantages of the invention, reference should be made to the ensuing detailed description taken in conjunction with the accompanying drawings.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION OF THE PREFERRED EMBODIMENTS

Figure 1:
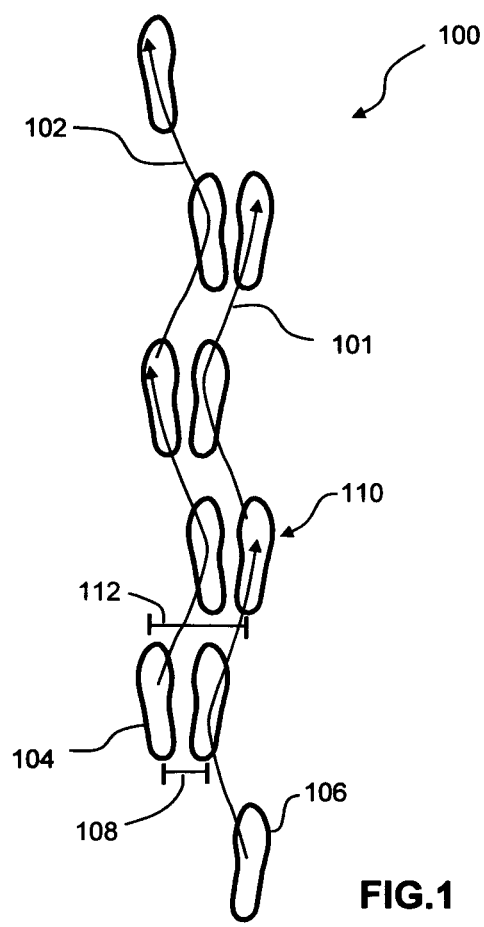
FIG. 1 is schematic view of a bipedal walk cycle.

Turning now to the drawings, FIG. 1 is a schematic view of a typical bipedal walk cycle 100. As seen in this Fig., a typical bipedal walk cycle 100 for generally linear forward motion incorporates a right foot sinuous path 101 and a left foot sinuous path 102. When both the right and left foot sinuous paths 101, 102 are combined, a biped walk cycle 100 producing forward generally linear motion is achieved. To begin a bipedal walk cycle 100, a first foot 104 in an initially forward position carries the majority of the weight of a person. A second foot 106 is then lifted and moved in a generally forward direction, as indicated by the directional arrows. As the second foot 106 moves towards the first foot 104, the motion of second foot 106 curves inwards towards the first foot 104 to form an arcuate path. A minimum interspatial distance 108 between the two feet 104, 106 is defined when the first foot 104 and the second foot 106 achieve a minimum separation distance. At this point in the bipedal walk cycle 100, the second foot 106 usually carries no body weight and the first foot 104 bears the entire body weight of the person. Next, the second foot 106 curves away from the first foot 104 and contacts the ground surface at a position 110 that is located generally forward of the first foot 104 and achieves a maximum interspatial distance 112. As second foot 106 makes supportive contact with the ground surface, the weight of the person is distributed between both feet 104, 106.

As shown in FIG. 1, the bipedal walk cycle 100 is repeated in a similar manner as previously described but with the roles of the feet 104, 106 reversed. Thus, with second foot 106 carrying the majority of the weight of the person, first foot 104 is then lifted and moved in a generally forward direction, as indicated by the directional arrows. As first foot 104 moves towards second foot 106, the path of first foot 104 curves inwards towards second foot 106 to form an arcuate path. The minimum interspatial distance 108 between the two feet 104, 106 is defined when first foot 104 and second foot 106 achieve a minimum separation distance. At this point in the bipedal walk cycle 100, first foot 104 usually carries no body weight and second foot 106 bears the entire body weight of the person. Next, first foot 104 curves away from second foot 106 and contacts the ground surface at a position that is located generally forward of second foot 106 and achieves the maximum interspatial distance 112. As first foot 104 makes supportive contact with the ground surface, the weight of the person is distributed between both feet 104, 106.

The exact form of right and left sinuous paths 101, 102 is generally a product of body mechanics, such as hip rotation, weight transfer and numerous other postural alignments that are required for bipedal motion. The minimum interspatial distance 108 can be less than 0.5 inch and is generally dependant upon the physical structure and other attributes of the person walking. The maximum interspatial distance 112 is generally about shoulder width of the person but may vary depending on the gait and stride of the person.

Due to the close proximity of both feet at the minimum interspatial distance 108, it is possible to implement shoe mounted signal generators and a proximity sensor to detect when the feet pass each other during the walk cycle. Detection of the passing feet is discussed in further detail below with respect to FIG. 4.

Figure 2:
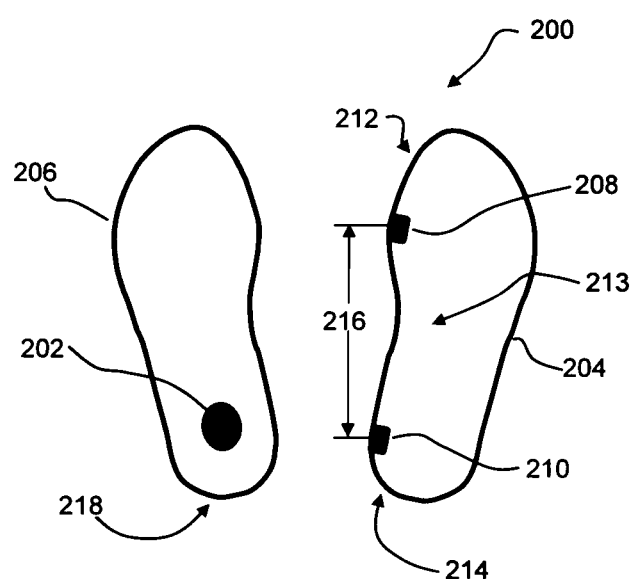
FIG. 2 is an elevational view illustrating a shoe mounted pedometer according to the invention.

Reference is now made to FIG. 2, which is an elevational view illustrating a pedometer generally designated with reference numeral 200 comprising a shoe mounted system capable of acquiring real time pedestrian performance data during ambulatory pedestrian motion. As shown in FIG. 2, pedometer 200 is incorporated into a right shoe 204 and a corresponding left shoe 206. Both right and left shoes 204, 206 generally form a matching pair of shoes suitable for wear and use in ambulatory motion such as walking, running, and jogging. The right shoe 204 has mounted thereon a first signal generator 208 and a second signal generator 210. The first signal generator 208 is positioned adjacent a relatively forward portion 212 of right shoe 204 and the second signal generator 210 is positioned adjacent a relatively rearward portion 214 of right shoe 204. Both first and second signal generators 208, 210 are preferably positioned along the inner margin of right shoe 204 so as to be nearest to the corresponding left shoe 206 and proximate an instep region 213 of right shoe 204. In an exemplary embodiment, first and second signal generators 208, 210 are each fabricated from permanent magnetic material that produces magnetic fields sufficient to reach a region of left shoe 206 at which a sensor and transmitter assembly 202 is located. As will be apparent to those of ordinary skill in the art, many different types of magnetic material may be used, such as ferromagnetic materials (e.g., cobalt and nickel) and ferrimagnetic materials, and composites such as Alnico, Ticonal, and sintered composites of powdered iron oxide and barium/strontium carbonate ceramic. A signal generator longitudinal separation distance 216 defines a fixed distance between first and second signal generators 208, 210 along the generally longitudinal axis of right shoe 204. In an exemplary embodiment, longitudinal separation distance 216 is approximately five inches; however, it is contemplated that other fixed dimensions for longitudinal separation distance 216 may be used depending on the relative size and configuration of the shoes. In an exemplary embodiment, signal generators 208, 210 are embedded within a sole (not shown) forming a part of right shoe 204. It is understood that signal generators 208, 210 may be incorporated into other components of right shoe 204 by molding or adhesing, or mechanically attached to an appropriate portion of right shoe 204 by any suitable attachment technique, such as loop-and-hook fastener material sold under the trademark Velcro.

Left shoe 206 has mounted thereon a sensor and transmitter assembly 202 located in a fixed position of left shoe 206. In an exemplary embodiment, sensor and transmitter assembly 202 comprises at least one proximity sensor (such as a Hall effect sensor) capable of sensing the magnetic field signals generated by generators 208, 210 mounted on right shoe 204, a microcontroller unit and a transmitter. These elements are discussed in further detail below with respect to FIG. 3. It is contemplated that sensor and transmitter assembly 202 is embedded within a sole (not shown) forming a part of left shoe 206. In alternate embodiments, sensor and transmitter assembly 202 may be coupled to other components and regions of left shoe 204. Although signal generators 208, 210 have been described with respect to the right shoe and the sensor and transmitter assembly 202 has been described with respect to the left shoe 206, one having ordinary skill in the art will readily appreciate that reversing the right and left shoe configurations is also possible.

Figure 3:
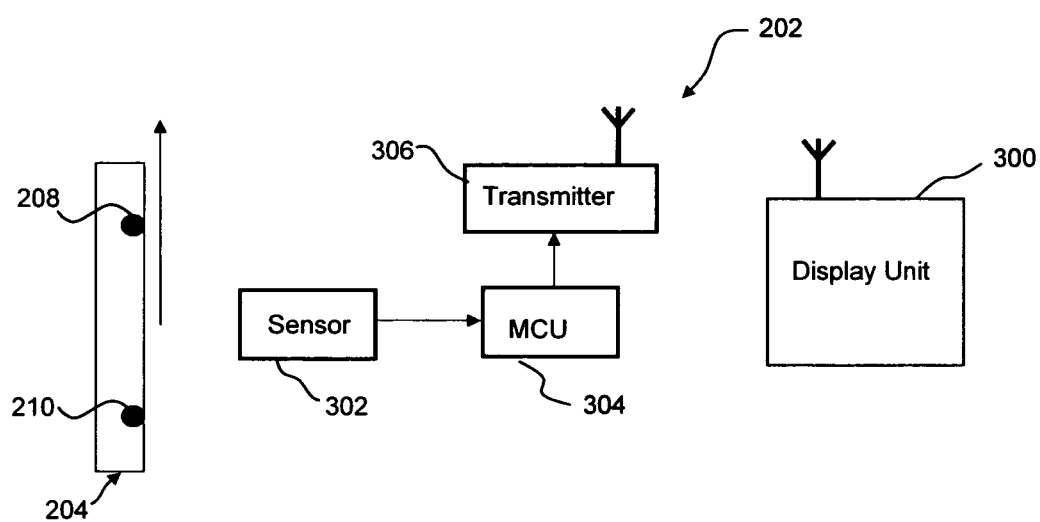
FIG. 3 is a block diagram of a pedometer having a shoe mounted signal generator, a sensor and transmitter and an associated separate pedestrian parameter display unit.

FIG. 3 is a block diagram of the pedometer of FIG. 2 having shoe mounted signal generators 208, 210, and a shoe mounted sensor and transmitter assembly 202 and an associated separate display unit 300. As seen in this Fig., a proximity sensor 302 is positioned in operable range with first and second signal generators 208, 210 such that magnetic impulse signals are induced in proximity sensor 302 when relative motion exists between right and left shoes 204, 206 in such a manner that signal generators 208, 210 pass by the region of left shoe 206 within the operational range of proximity sensor 302. In the magnetic implementation being described, proximity sensor 302 is preferably a Hall-effect sensor available from Allegro Microsystems, Inc., part number: A1395SEHLT. Alternatively, proximity sensor 302 may be an MR sensor available from Honeywell Microelectronics, part number: HMC1001.

Proximity sensor 302 is operatively coupled with a microcontroller unit (MCU) 304 such that magnetic impulse signals received by proximity sensor 302 are converted to electrical signals which are coupled to MCU 304 for various signal processing functions (discussed in further detail below with respect to FIGS. 5 & 6). MCU 304 is operatively coupled with transmitter 306 for wireless transmission of processed pedestrian performance data to display unit 300. Performance data may include: total steps, steps per minute, instantaneous foot speed, average foot speed, cadence, total distance traveled, distance per stride, calories burned and other parametric data produced by MCU 304. MCU 304 and transmitter 306 are preferably combined in a type AT3 chipset available as SensRcore part number nRF24LO1 from ANT of Cochrane, Alberta, Canada. Transmitter 306 communicates wirelessly with display unit 300 by either unidirectionally or bidirectionally transferring performance data and step information thereto. It is contemplated that display unit 300 may be a third party performance monitoring device or fitness computer such as the Edge 705 unit available from Garmin Ltd., part number 010-00555-20. In an alternate embodiment, transmitter 306 may be configured to communicate and transfer performance data to other electronic devices such as a cell phone, an Mp3 player or other portable display device.

In an exemplary embodiment, the wireless communication protocol used between transmitter 306 and display unit 300 is a wireless sensor network communication protocol commonly referred to as "ANT" available from Dynastream Innovations, Inc. of Cochrane, Alberta, Canada. Some features of the ANT protocol include low power consumption, low cost overhead, and the ability of multiple transceivers to co-exist in close proximity to other similar transceivers. The ANT protocol has an estimated efficiency of about 47 percent due to various programming configurations that reduce power consumption in a standby state. However, one having ordinary skill in the art would readily appreciate that other types of wireless communication protocols such as Bluetooth or ZigBee (based upon IEEE standard 802.15.4) may be utilized to facilitate data transfer between transmitter 306 and display unit 300.

A suitable source of D.C. electrical power, such as a battery (not shown) is used to power the system elements 302, 304, and 306 shown in FIG. 3. In the alternative, the magnetic fields generated by first and second signal generators 208, 210 can serve as an energy source when combined with a coil and a D.C. rectifier circuit included in sensor and transmitter assembly 202. This arrangement eliminates the need to replace a battery when the useful energy is depleted from the battery. Display unit 300 is provided with a separate power source, such as a battery.

Figure 4:
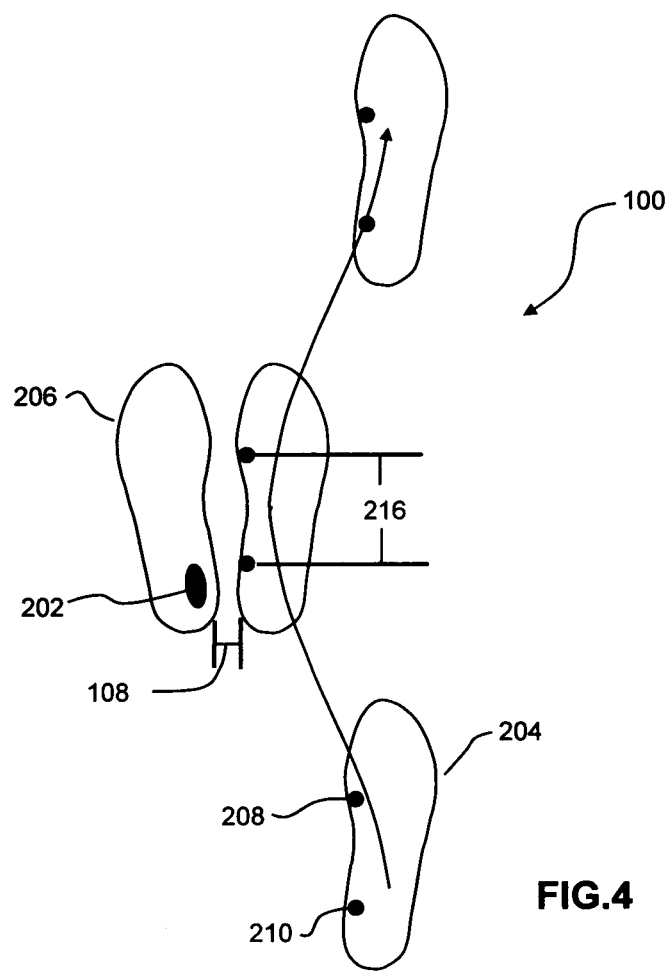
FIG. 4 is an enlarged schematic view of a typical biped walk cycle.
Figure 5:
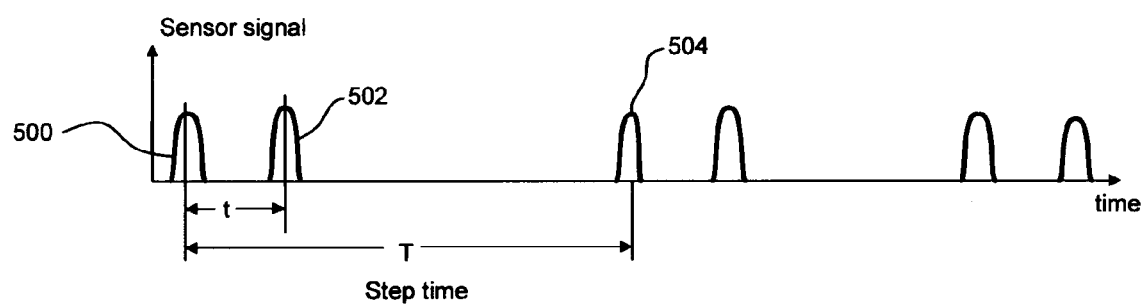
FIG. 5 is a graph illustrating sensor signals versus time.
Figure 6:
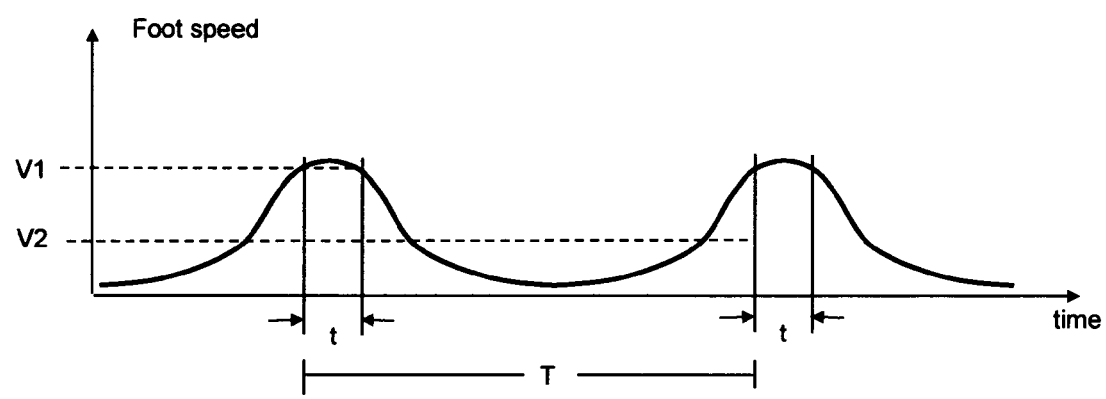
FIG. 6 is a graph illustrating foot speed versus time.

Reference is now made to FIGS. 4 and 5, in which FIG. 4 is an enlarged schematic view of a representative portion of a bipedal walk cycle 100 and FIG. 5 is a graph illustrating sensor signals versus time. The pedometer of the present invention generates a step count and step time as one shoe passes by the other shoe. For example, in FIG. 4, as right shoe 204 follows the right foot sinuous path 101, first and second signal generators 208, 210 are successively brought into close proximity with sensor and transmitter assembly 202. At the minimum interspatial distance 108, and as the first signal generator 208 passes by the proximity sensor within sensor and transmitter assembly 202, a first impulse signal 500 (FIG. 5) is generated by proximity sensor 302 (FIG. 3) with the maximum value occurring at the point of closest approach between generator 208 and proximity sensor 302. This first impulse signal is coupled to MCU 304 (FIG. 3) in sensor and transmitter assembly 202. As the right shoe 204 moves an additional distance forward, equal to the fixed longitudinal separation distance 216, the second signal generator 210 passes the proximity sensor 302 within sensor and transmitter assembly 202 and generates a second impulse signal 502 that is received by MCU 304. This pair of first and second impulse signals 500, 502 is separated by a first time interval "t", which can be determined by MCU 304 given the known separation distance between signal generators 208, 210. As the left shoe 206 progresses to the next step in the bipedal walk cycle 100, a third impulse signal 504 is generated at a second time interval as the proximity sensor 302 contained within sensor and transmitter assembly 202 moves by the second signal generator 210. Once the third impulse signal 504 is generated, the value of a parameter termed step time "T" can be determined by MCU 304.

Upon acquiring the real time pedestrian data "t" and "T" as discussed above, various other performance parameters can be calculated such as cadence, speed and total distance traveled. Pedometer cadence is calculated by dividing the total number of steps by the sum total of step time. The cadence value may then be converted into various units such as steps/minute by applying standard time conversions. For total distance traveled, and referring to FIG. 6, first an average foot speed V1 is determined over first time interval "t". Average foot speed is calculated by using the fixed separation distance between the first and second signal generators 208, 210 and first time interval "t". In an exemplary embodiment, the longitudinal distance separating the first and second signal generators 208, 210 is 5 inches and the resulting foot speed over first time interval "t" is defined by V1=5/t inches per second. Second, a coefficient "K" is used to proportionally scale average foot speed V1 to average step speed V2. Coefficient K may be determined either by calibration based on actual user stride length or by assembling a table of average stride lengths based upon standard physical attributes relating stride length to the height of a person. Once "K" is determined, the equation for step speed is defined by V2=KV1. Third, step length "d" is determined by multiplying V2 by "T", d=V2T. The total number of steps "N" is determined by accumulating the total number of step times "T". Finally, to obtain total distance traveled "D", step length "d" is multiplied by the total number of steps "N", D=Nd. All the above algorithms can be readily implemented in MCU 304 using standard techniques.

The resulting performance data determined by MCU 304 can be stored in MCU 304 memory for subsequent analysis, and also transmitted by transmitter 306 to display unit 300 to provide real time performance data feedback to the user.

Although described above as operating in the magnetic domain, signal generators 208, 210 and sensor 302 may be implemented using other technologies, such as optical and r.f. technologies. For example, for an implementation using optical technology signal generators 208, 210 may comprise light emitting diodes (LEDs) which generate light beams of a known wave length, and sensor 302 may comprise an optical sensor for sensing light radiation at the LED wave length. In such an implementation, a source of electrical energy, such as a battery, must be provided to power the LED signal generators 208, 210. Similarly, for an implementation using r.f. technology signal generators 208, 210 may comprise RFID tags which generate r.f. signals at a known frequency and sensor 302 may comprise an RFID reader/interrogator unit capable of sensing r.f. signals at the known frequency. The RFID tags may comprise active or passive RFID tags. If active RFID tags are employed, a source of electrical energy, such as a battery, must be provided to power the RFID tags. If passive RFID tags are employed, they will be powered by the r.f. interrogation signals from sensor 302 and no separate electrical power source is required for the signal generators 208, 210. One suitable choice for a passive RFID tag is an Atmel type ATA5577 RFID tag available from Atmel Corporation of San Jose, Calif. One suitable choice for an RFID reader/interrogator is an Atmel type ATA5577 device, also available from Atmel Corporation of San Jose, Calif.

As will now be apparent, pedometers fabricated according to the teachings of the present invention offer accuracy and convenience advantages over known pedometers. Firstly, the use of a shoe mounted proximity sensor and signal generator provides improved accuracy for determining step count. This improved accuracy results from generating impulse signals each time the feet pass by each other. In addition, pedometers fabricated according to the teachings of the present invention reduce the number of recorded "false steps" by eliminating reliance on mechanical movements and axial alignment of accelerometers. Further, by employing a shoe-mounted sensor and transmitter that wirelessly communicates with a separate display, greater user convenience is achieved over pedometers that have integral display units. Lastly, by employing the proximity sensor and signal generator configuration shown in FIGS. 2-5, a high level of step count accuracy can be achieved at very low walking speeds.

While the invention has been described with reference to particular embodiments, various modifications, alternate constructions and equivalents may be employed without departing from the spirit of the invention. For example, while certain circuit components have been disclosed, other equivalent units may be employed, as desired. Therefore, the above should not be construed as limiting the invention, which is defined by the appended claims.

What is claimed is:

1. A pedometer comprising:
a first signal generator carried by a first portion of a first shoe for generating first signals radiating generally outwardly of said first shoe;
a second signal generator carried by a second portion of said first shoe for generating second signals radiating generally outwardly of said first shoe, said first and second signal generators being separated by a fixed distance extending generally longitudinally of said first shoe; and
a sensor assembly coupled with a second shoe, said sensor assembly including a sensor for directly sensing said first signals and said second signals radiating generally outwardly of said first shoe and for generating corresponding electrical signals, and a microcontroller unit having an input coupled to said sensor for receiving said corresponding electrical signals and using said corresponding electrical signals and the value of said fixed distance to produce pedestrian performance data.

2. The pedometer of claim 1 wherein said first and second signal generators and said sensor are aligned on said first and second shoes in facing relation when said first and second shoes are worn by a user.

3. The pedometer of claim 1 wherein said first shoe has an inner margin; and wherein said first and second signal generators are mounted adjacent said inner margin of said first shoe.

4. The pedometer of claim 3 wherein said second shoe has an inner margin; and wherein said sensor is mounted adjacent said inner margin of said second shoe.

5. The pedometer of claim 1 wherein said first and second signal generators comprise permanent magnets; and wherein said sensor comprises a device for converting the outwardly radiating magnetic fields generated by said permanent magnets to corresponding electrical signals.

6. The pedometer of claim 5 wherein said sensor comprises a Hall effect sensor device.

7. The pedometer of claim 5 wherein said sensor comprises an MR sensor device.

8. The pedometer of claim 1 wherein said first and second signal generators comprise light radiation sources; and wherein said sensor comprises a device for converting the outwardly radiating light radiation generated by said light radiation sources to corresponding electrical signals.

9. The pedometer of claim 8 wherein said light radiation sources are light emitting diodes.

10. The pedometer of claim 1 wherein said first and second signal generators comprise RFID tags for generating outwardly radiating r.f. signals of known frequency; and wherein said sensor comprises an RFID reader device for converting r.f. signals received from said RFID tags to corresponding electrical signals.

11. The pedometer of claim 10 wherein said RFID tags are active RFID devices.

12. The pedometer of claim 10 wherein said RFID tags are passive RFID devices.

13. The pedometer of claim 1 further including a transmitter coupled to said microcontroller unit for transmitting said pedestrian performance data to a receiver/display unit to provide real time user feedback.

\* \* \* \* \*